(12) United States Patent
Ashmore et al.

(10) Patent No.: US 9,410,045 B2
(45) Date of Patent: *Aug. 9, 2016

(54) ANTIFOULING PAINT SYSTEM

(71) Applicant: Rohm and Haas Company, Philadelphia, PA (US)

(72) Inventors: John W. Ashmore, Lansdale, PA (US); David M. Laganella, Swedesboro, NJ (US); Boris Polanuyer, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/435,632

(22) PCT Filed: Oct. 31, 2013

(86) PCT No.: PCT/US2013/067646
§ 371 (c)(1),
(2) Date: Apr. 14, 2015

(87) PCT Pub. No.: WO2014/074375
PCT Pub. Date: May 15, 2014

(65) Prior Publication Data
US 2015/0259543 A1     Sep. 17, 2015

Related U.S. Application Data

(60) Provisional application No. 61/722,937, filed on Nov. 6, 2012.

(51) Int. Cl.
| | | |
|---|---|---|
| *A01N 43/80* | (2006.01) | |
| *A01N 25/08* | (2006.01) | |
| *A01N 43/72* | (2006.01) | |
| *C09D 5/16* | (2006.01) | |
| *C09D 163/00* | (2006.01) | |
| *C08K 5/47* | (2006.01) | |
| *C09D 133/06* | (2006.01) | |

(52) U.S. Cl.
CPC ............... *C09D 5/1625* (2013.01); *C08K 5/47* (2013.01); *C09D 5/16* (2013.01); *C09D 133/064* (2013.01); *C09D 163/00* (2013.01); *Y10T 428/31515* (2015.04)

(58) Field of Classification Search
None
See application file for complete search history.

(56) References Cited

U.S. PATENT DOCUMENTS

| | | | | |
|---|---|---|---|---|
| 3,212,936 A * | 10/1965 | McEvoy | ................. | H01M 4/96 252/182.1 |
| 3,546,235 A * | 12/1970 | Bader | ..................... | A01N 43/26 544/145 |
| 3,712,908 A * | 1/1973 | Bader | ................. | C07D 339/04 540/596 |
| 4,025,693 A * | 5/1977 | Milne | ................. | C09D 5/1675 106/18.35 |
| 4,344,875 A * | 8/1982 | Parks | ................. | C09D 5/1643 424/78.09 |
| 4,940,761 A * | 7/1990 | Spinelli | .............. | C08G 59/3209 525/195 |
| 5,091,399 A * | 2/1992 | Osei-Gyimah | ...... | C07D 417/12 514/367 |
| 5,833,742 A * | 11/1998 | Willingham | ........... | A01N 37/22 106/18.3 |
| 5,853,463 A * | 12/1998 | Willingham | ......... | C09D 5/1625 106/18.3 |
| 5,855,654 A * | 1/1999 | Willingham | ......... | C09D 5/1625 106/18.3 |
| 6,008,244 A * | 12/1999 | Willingham | ........... | A01N 33/12 106/18.32 |
| 6,090,399 A * | 7/2000 | Ghosh | .................... | A01N 25/08 424/405 |
| 6,149,927 A * | 11/2000 | Ghosh | .................... | A01N 59/16 424/405 |
| 6,221,374 B1 * | 4/2001 | Ghosh | .................... | A01N 25/10 424/405 |
| 6,303,078 B1 * | 10/2001 | Shimizu | ................ | D06M 16/00 422/14 |
| 6,610,282 B1 * | 8/2003 | Ghosh | .................... | A01N 25/10 424/405 |
| 6,676,954 B2 * | 1/2004 | Dai | ........................ | A01N 43/80 424/400 |
| 2002/0001618 A1 * | 1/2002 | Dai | ........................ | A01N 43/80 424/468 |
| 2003/0065192 A1 * | 4/2003 | Ghosh | ................. | C07D 417/12 548/213 |
| 2004/0197564 A1 * | 10/2004 | Camp | ................. | C09D 5/1618 428/413 |
| 2007/0215000 A1 * | 9/2007 | Reybuck | ................ | A01N 43/80 106/18.33 |
| 2007/0237738 A1 * | 10/2007 | Hanzlicek | ................. | A61L 2/18 424/76.2 |
| 2009/0053166 A1 * | 2/2009 | Niimoto | .................. | B63B 59/04 434/78.09 |
| 2015/0259543 A1 * | 9/2015 | Ashmore | ................. | C09D 5/16 428/414 |

FOREIGN PATENT DOCUMENTS

| | | |
|---|---|---|
| EP | 1918190 A1 | 5/2008 |
| KR | 20010099049 A | 11/2001 |

OTHER PUBLICATIONS

Heaton, et al., "Studies on Biocide Release and Performance of Novel Anti-Fungal Paints", Biofouling, vol. 3, pp. 35-43 (1991).

* cited by examiner

*Primary Examiner* — Peter A. Salamon
(74) *Attorney, Agent, or Firm* — Kenneth Crimaldi

(57) ABSTRACT

A coated substrate having an epoxy coating. The epoxy coating contains 4,5-dichloro-2-n-octylisothiazolin-3-one.

14 Claims, No Drawings

ANTIFOULING PAINT SYSTEM

This invention relates to an antifouling coating containing 4,5-dichloro-2-n-octylisothiazolin-3-one (DCOIT).

A coating containing DCOIT is disclosed in Heaton et al., *Biofouling*, vol. 3, 35-43 (1991). The coating described in this reference does not achieve controlled release of DCOIT, with an expected life of only 170 days.

The problem addressed by this invention is to provide an improved coating which provides long-term controlled release of DCOIT.

STATEMENT OF THE INVENTION

The present invention is directed to coated substrate comprising an epoxy coating, said epoxy coating comprising 4,5-dichloro-2-n-octylisothiazolin-3-one.

DETAILED DESCRIPTION OF THE INVENTION

Unless otherwise specified, temperatures are in degrees centigrade (° C.), references to percentages are percentages by weight (wt %) and amounts and ratios of DCOIT are on an active ingredient basis. As used herein, when a collection of particles has D50 of a certain value, then 50 percent of the particles by volume have a diameter less than or equal to that value. For non-spherical particles, the diameter is the largest dimension. An epoxy coating is a dry film produced by mixing an epoxy resin with a hardener and allowing the mixture to cure on a substrate. A marine coating composition is a coating composition that is capable of forming a dry coating on the surface of a marine object. After formation of the dry coating, the dry coating will adhere to the surface for a usefully long time, even when some or all of the coated surface remains under water for significant amounts of time (i.e., at least one hour per day). Marine objects are those that are put to use in environments in which some or all of the object is under water for significant amounts of time. Examples of marine objects include ships, piers, docks, pilings, fishnets, heat exchangers, dams, and piping structures, such as intake screens. Preferably, the substrate is a marine object.

Seawater is water from a sea or ocean. On average, seawater in the worlds oceans has a salinity of about 3.5 wt % and an average density at the ocean surface of 1.025 g/ml. Artificial seawater is a mixture of water with dissolved mineral salts that simulates seawater. An example of artificial seawater is synthetic seawater available from RICCA (ASTM D1141).

The substrate for the epoxy coating may be an uncoated surface, e.g., a marine object, or another coating on the surface of the marine object, e.g., an underlayer of primer or paint on the surface. Preferably, there is a second coating placed over the epoxy coating, such that the epoxy coating is between the substrate and the second coating. Preferably, the second coating is a self-polishing coating (e.g., a metal acrylate copolymer paint, typically incorporating zinc or copper carboxylate groups, or a silyl acrylate copolymer paint) or a foul-release coating (e.g., silicone paint). Preferably, the epoxy coating contains at least 0.25 wt % DCOIT, preferably at least 0.5 wt %, preferably at least 1 wt %, preferably at least 1.2 wt %, preferably at least 1.4 wt %, preferably at least 1.6 wt %, preferably at least 1.8 wt %, preferably at least 2 wt %; preferably the epoxy coating contains no more than 4 wt % DCOIT, preferably no more than 3.5 wt %, preferably no more than 3 wt %, preferably no more than 2.5 wt %, preferably no more than 2 wt %, preferably no more than 1.8 wt %.

Preferably, the second coating layer has less than 0.5 wt % DCOIT, preferably less than 0.4 wt %, preferably less than 0.3 wt %, preferably less than 0.2 wt %, preferably less than 0.1 wt %, preferably less than 0.05 wt %, preferably less than 0.02 wt %, preferably less than 0.01 wt %.

Preferably, the epoxy coating is substantially free of other cured resins, e.g., acrylics, urethanes, silicones; i.e., it contains less than 10 wt % total of other resins, preferably less than 8 wt %, preferably less than 6 wt %, preferably less than 4 wt %, preferably less than 2 wt %, preferably less than 1 wt %. Preferably, the epoxy coating is a cured aromatic epoxy resin, preferably a bisphenol A resin or a novolac epoxy resin, preferably a bisphenol A resin; said aromatic epoxy resin preferably comprising at least 50 wt % bisphenol A (exclusive of hardener and DCOIT), preferably at least 60 wt % bisphenol A, preferably at least 70 wt %, preferably at least 80 wt %, preferably at least 90 wt %, preferably at least 95 wt %.

Preferably, the wet film thickness of the epoxy coating is at least 25 microns, preferably at least 50 microns, preferably at least 100 microns, preferably at least 200 microns; preferably no more than 500 microns, preferably no more than 400 microns, preferably no more than 300 microns. Preferably, the wet film thickness of a second coating layer over the epoxy layer is at least 25 microns, preferably at least 50 microns, preferably at least 100 microns, preferably at least 200 microns; preferably no more than 500 microns, preferably no more than 400 microns, preferably no more than 300 microns. The thickness of the dry film formed upon cure of the wet coating would be expected to be less than the wet thickness by an amount corresponding to the solvent content of the wet coating material. Preferably, the dry (cured) film thickness of the epoxy coating is at least 20 microns, preferably at least 40 microns, preferably at least 80 microns, preferably at least 160 microns; preferably no more than 400 microns, preferably no more than 320 microns, preferably no more than 240 microns. Preferably, the dry (cured) film thickness of the second coating layer over the epoxy layer is at least 18 microns, preferably at least 35 microns, preferably at least 70 microns, preferably at least 140 microns; preferably no more than 350 microns, preferably no more than 280 microns, preferably no more than 210 microns.

Preferably, DCOIT is added to an epoxy resin, e.g., bisphenol A or other aromatic epoxy resin, and the epoxy resin is cured by adding a hardener, usually an amine or amide compound. The DCOIT/resin/hardener mixture is coated on the substrate and allowed to cure. Preferably, DCOIT is dissolved or slurried in a solvent prior to mixing with the epoxy resin. Suitable solvents include, e.g., xylenes, mineral spirits, ketones (e.g., MIBK, MIAK) and alcohols. Preferably, the weight ratio of aromatic epoxy resin to hardener is at least 2:1, preferably at least 2.5:1, preferably at least 3:1, preferably at least 4:1, preferably at least 5:1; preferably the weight ratio of aromatic epoxy resin to hardener is no greater than 7:1, preferably no greater than 6:1, preferably no greater than 5:1.

Preferably, the DCOIT is added to the epoxy resin in the form of a controlled-release system, i.e., DCOIT adsorbed on a carbon-based adsorbent or a polymeric resin, or encapsulated DCOIT.

Particles of polymeric resin preferably contain one or more vinyl polymer. Preferred vinyl polymers contain polymerized units of monomers having any atom of nitrogen, oxygen, sulfur, or any halogen in the amount of 0-5%; more preferably 0-2%; more preferably 0-2%; more preferably 0-1%; more preferably 0%. Preferred vinyl polymers contain one or more polymerized units of one or more vinyl aromatic monomer. Preferred vinyl aromatic monomers have no atoms other than carbon and hydrogen. Preferably the amount of polymerized units of vinyl monomers in the vinyl polymer is, by weight based on the weight of the vinyl polymer, 75% or more; more preferably 90% or more; more preferably 98% or more; more preferably 100%. Preferred vinyl aromatic monomers are styrene, divinyl benzene, and mixtures thereof. Preferred vinyl polymers are fully crosslinked. Preferably, the amount of polymerized units of monomers that contain two or more polymerizable carbon-carbon double bonds is 10% or more; more preferably 50% or more; more preferably 75% or more; more preferably 90% or more.

Preferably the polymeric resin particles have swell ratio of 20% or lower; more preferably 10% or lower; more preferably 5% or lower; more preferably 2% or lower; more preferably 1% or lower. The collection of polymeric resin particles preferably has D50 of 0.1 micron or larger; preferably 120 micron or smaller; more preferably 100 micron or smaller; more preferably 80 micron or smaller, more preferably 60 micron or smaller. The polymeric resin particles preferably have specific surface area of 500 $m^2/g$ or more; more preferably 700 $m^2/g$ or more; more preferably 950 $m^2/g$ or more. The particles (c) preferably have specific surface area of 2,000 $m^2/g$ or less. Preferably, the amount of water in the collection of polymeric resin particles, by weight based on the weight of the collection of particles (c), is 5% or less; more preferably 2% or less. In the coating of the present invention, it is contemplated that some or all of the water-insoluble biocide will adsorb onto the surface of the polymeric resin particles.

Suitable carbon-based adsorbents include, for example, carbons such as those derived from coal, wood, coconut shells, lignin or animal bones; carbon blacks such as those derived from gas phase pyrolysis of hydrocarbons; natural or synthetic graphites or graphite whiskers; cokes such as those obtained from the destructive distillation of bituminous coal, petroleum and coal-tar pitch; high surface area activated carbons; and pyrolyzed carbonaceous adsorbents prepared by pyrolysis of resinous polymers (such as AMBERSORB carbonaceous adsorbents, available from Rohm and Haas Company, Philadelphia, Pa.; see Carbonaceous Adsorbents for the Treatment of Ground and Surface Waters, J. W. Neely and E. G. Isacoff, Vol 21 of Pollution Engineering and Technology Series, Marcel Dekker, Inc., New York, N.Y., pp 41-78 (1982), for further general and specific details on pyrolyzed carbonaceous adsorbents and their method of preparation). Preferably the carbon-based adsorbent is selected from one or more of activated carbon and pyrolyzed carbonaceous adsorbent.

Particularly preferred are high surface area "activated" carbons, such as those prepared by direct chemical activation. Petroleum Derived Carbons (by T. M. O'Grady and A. N. Wennerberg), American Chemical Society Symposium Series, Vol. 303, J. D. Bacha et al., eds., American Chemical Society Publications, Washington, D.C., (1986), may be consulted for further general and specific details on these activated carbons and their method of preparation. Preferably, the surface area of the activated carbon is at least 600 $m^2/g$, preferably at least 800 $m^2/g$, preferably at least 1000 $m^2/g$, preferably at least 1200 $m^2/g$, preferably at least 1400 $m^2/g$; preferably no more than 2500 $m^2/g$, preferably no more than 2200 $m^2/g$.

The carbon-based adsorbents are typically particulate materials having an average particle size, e.g., a D50 of 0.01 to 5 mm (10 to 5000 microns), preferably from 0.02 to 2 mm and more preferably from 0.1 (less than 100 mesh) to 1 mm (about 18 mesh). When relatively large particle sized carbon-based adsorbents are used, the average particle size typically ranges from 0.5 to 3 mm, preferably from 1 to 2 mm (greater than 18 mesh) and more preferably from 1.5 to 2 mm When smaller particle sized carbon-based adsorbents are used, the average particle size typically ranges from 0.02 to 0.3 mm and preferably from 0.03 to 0.15 mm (30 to 150 microns, less than 100 mesh).

DCOIT may be adsorbed on carbon by mixing DCOIT, as a melt or as a solution, with the carbon-based adsorbent. Suitable solvents for the DCOIT are any which dissolve DCOIT, do not destabilize it and do not react with the carbon-based adsorbent. Suitable solvents include alcohols, such as methanol, ethanol and propanol; esters, such as ethyl acetate and butyl acetate; ketones, such as acetone and methyl isobutyl ketone; xylenes; mineral spirits; and nitriles, such as acetonitrile. Preferred solvents are $(C_1-C_4)$alcohols, xylenes and mineral spirits.

Encapsulated DCOIT comprises a core material containing DCOIT; and one or more layers of wall material encapsulating the core material to form a capsule. A microcapsule having a wall formed from a hydrolyzed polyvinyl acetate and phenolic resin may be used for this purpose. The term "PVA" means partially or fully hydrolyzed polyvinyl acetate. In the case of microcapsules formed using partially hydrolyzed polyvinyl acetate, the hydrophilic character of the capsule shell can be adjusted by varying the amount of partially hydrolyzed PVA that is incorporated in the wall. Preferably, the PVA and the phenolic resin components (e.g., urea-resorcinol-formaldehyde) are incorporated into the capsule shell in the amount of from about 4 to about 8 parts by weight partially hydrolyzed PVA and about 20 to 30 parts phenolic resin. The encapsulation procedure for making these microcapsules is well known in the art. Optionally, DCOIT is mixed with a solvent such as a substituted aromatic solvent to facilitate the encapsulation.

An amino-formaldehyde microcapsule (e.g. a melamine-formaldehyde ("MF") shell provides very stable microcapsules impermeable to xylene, but tends to be too impermeable in water to provide good bio-efficacy for use in conventional antifouling paints. It has been found that by optimizing the shell thickness, a balance of the desired properties of the microcapsules can be achieved. In one embodiment of the present invention, control of microcapsule shell thickness by particle size distribution and shell-to-core ratios contributes diffusion performance or sustained release characteristics. Preferably, in a microencapsulated DCOIT based on an amino-urea-formaldehyde shell system, the target wall thickness is about 0.1 to about 0.2 micron, or the shell to core ratio is about 0.03/1 to 0.05/1 by weight depending on the mean capsule diameter and overall capsule size distribution profile.

Partially hydrolyzed PVA functions as a dopant in the amino-urea formaldehyde wall. In accordance with one embodiment of the invention an agent referred to herein as a "dopant" is incorporated in the microcapsule wall to enhance the ability of water to leach the DCOIT from the capsule. Representative examples of dopants include partially and fully hydrolyzed PVAs, hydroxylethylcellulose, hydroxypropylcellulose, methylcellulose, hydroxyethylmethylcellulose, hydroxypropylmethylcellulose, hyroxybutylmethylcellulose, ethylhydroxyethylcellulose and polyethylene glycols. While the amount of dopant used will vary with the nature and thickness of the wall, in a particular embodiment the dopants are incorporated into the wall in an amount of about 2 to about 10% by weight based upon the weight of the wall materials. For capsules having thick walls, the amount of required dopant is expected to be more than the effective amount for thinner wall capsules.

In order to enhance water release or extraction of DCOIT, in one embodiment of the invention, DCOIT is mixed with a partially water miscible solvent. Examples of partial water miscible solvents include, for example, esters and ethers and, more particularly, dibasic esters such as dimethyl adipate, or a blend of diisobutyl adipate, diisobutyl glutarate and diisobutyl succinate, polyglycol P-1200, and glycol ether EB acetate. Miscible organic solvents having partial water solubility in the range of approximately 0.5 to 5% in water are used in one embodiment of the invention. The upper range on the water solubility is not an absolute limit but reflects that if the solvent is more water soluble, it may move into the continuous phase and not remain with DCOIT to enhance its water leachability. High boiling hydrophilic solvents, for example, having boiling points above 175° C., are desirable. If the boiling point of this solvent is too low, the solvent is difficult to retain in the microcapsule during the capsule drying operation. Preferably, the higher boiling partially water miscible solvent is incorporated into the core in an amount of about 5 to about 50% and in other embodiments in an amount of about 10 to 25% by weight based upon the weight of DCOIT.

Preferably, a dual walled capsule is used. In particular a dual encapsulation process with a first interfacial capsule wall of acrylic polymer and second wall of PVA-urea-resorcinol-glutaraldehyde ("PVA-URG") can be used. The dual acrylic-PVA-URG system is advantageous because it provides a formaldehyde free product. Encapsulation based on PVA-URG or acrylic alone typically results in quite leaky capsules that are difficult to recover as a powder. However, combining the two systems to form hybrid capsule shells has resulted in dry free flow capsule powders.

Preferably, a dual encapsulation process is used, with a first interfacial capsule wall of acrylic polymer and PVA-urea-resorcinol-formaldehyde ("PVA-URF") polymer. Preferably, dual wall microcapsules are formed comprising a first wall that is an interfacial reaction product of an aromatic polyisocyanate, a second wall of PVA-URF condensation polymer. Other microcapsule wall systems that can be used in the present invention include a melamine-formaldehyde ("MF") shell capsule further re-encapsulated with PVA-URF; an MF shell capsules re-encapsulated with PVA-URG polymer; a PVA-URF shell capsule re-encapsulated with an MF process; a hydrophilic shell comprising gelatin-gum arabic as a first shell and a second shell of MF or a URF condensation polymer.

Regarding the dual wall systems, the MF provides significant improvement in xylene stability while the PVA-URF or PVA-URG wall provides additional hydrophilicity in the shell to facilitate diffusion of DCOIT in an aqueous environment. The dual wall system provides shell strength to minimize capsule damage during paint formulation and spray application of the paint. The ultimate shell characteristics for microencapsulated DCOIT are achieved by adjusting the thickness of the two wall materials to afford a balance of xylene stability and diffusion of DCOIT in seawater.

Preferably, DCOIT is first encapsulated in a thin (e.g., less than about 0.1 micron) MF wall, and then further encapsulated in a PVA wall as described above. In this case the use of the solvent diluent like the SAS 310 may not be necessary for the encapsulation using the PVA-URF system since the MF wall prevents DCOIT from reacting with the wall components. Thus, this dual encapsulation process allows DCOIT to be encapsulated without the diluting effect of solvent and therefore affords a more cost effective product. Of course, the partially water miscible solvent may continue to be used with DCOIT to enhance water leachability.

Preferably, multi-shell microcapsules comprising an interfacial first wall with the reaction of an aromatic polyisocyanate, a second shell of gelatin-gum arabic and a third overcoat capsule wall of MF. The 3-wall system of isocyanate/gelatin-gum arabic/MF is just another method of controlling capsule-wall permeability in an aqueous environment. The isocyanate-gelatin interface reduces premature diffusion of DCOIT in the xylene-based paints. The interfacial reaction of polyisocyanate in conjunction with the PVA-URF provides another method of microencapsulating DCOIT. The interfacial skin of polyurethane or polyurea formed by the reaction of the isocyanate with PVA or a polyamine provides an additional barrier for improving capsule stability in the xylene based MAF paints.

Preferably, the first wall of the microcapsules is a water-soluble cationic amino resin, e.g., a water-soluble amino resin prepolymer obtained by converting an amino resin prepolymer (namely, a prepolymer of (thio)urea(-formaldehyde) resin, melamine(-formaldehyde) resin or benzoguanamin (formaldehyde) resin) as used in a second coating step described hereinafter by reaction with a cationic modifier agent. For example, urea-formaldehyde resin prepolymer may be subjected to polycondensation in a known manner together with a cationic modifier agent, such as diethylenetriamine, triethylenetetramine, tetraethylenepentamine, guanidine; dicyandiamide, guanylurea, dicyandiamide formate, dimethylaminoethanol, diethylaminoethanol, diethanolamine, oxazolidine, polyphenyl-biguanide or the like. A particularly preferred example thereof is a urea-formaldehyde resin prepolymer modified with diethylenetriamine, triethylenetetramine or tetraethylenepentamine (a representative commercially available product of which may be diethylenetriamine-modified product, available under a trade name of "U-RAMIN P-1500", from Mitsui Kagaku K. K.). The water-soluble cationic amino resin may preferably be used in 5-50 wt. parts, particularly 10-25 wt. parts, per 100 wt. parts of the core material.

Preferably, the microcapsules should be small in order to be used in spray applications and to provide better distribution of the active ingredient in the paint film. Preferably, the capsule size range is about 5 microns to about 40 microns, and more typically about 5 microns to about 20 microns. Distribution of the biocide improves with smaller capsules such as less than 10 microns.

Preferably, the microcapsules are dried before incorporating them into the paint formulation. Any conventional process for drying microcapsules including spray drying can be used for this purpose. However, for some paints it is possible to incorporate the microcapsules into the paint without drying. This is particularly true with water based paints.

Preferably, the encapsulated biocide is combined with a film forming polymer or binder such as the film forming polymers and binders that have been proposed for use in marine paints, gel coats, and similar paints (e.g., natural or synthetic resin or rosin binders) to provide coating compositions. In one embodiment of the invention, marine antifouling paint compositions can be prepared. Such paints can be prepared by incorporating the free biocide and the microcapsules described herein into the paint in an amount that is sufficient to impart the desired antifouling properties. Such amounts can be readily determined empirically by those skilled in the art. Examples of a marine paints reported in the literature that are useful herein may contain from 5 to 50% by weight, or in other cases from 10 to 25% by weight, xylene or another solvent base, from 20 to 30% by weight zinc resinate to plasticize the resin binder, from 10 to 20% by weight resin binder, optionally from 0 to 50% , or in other cases about 30 to 40% by weight, cuprous oxide pigment, and 4 to 6% by weight thixotropic viscosity modifier. Another type of marine paint may contain from 15% to 20% of polymer solids (binder), optionally up to 5% rosin, a total of from 10% to 15% biocide, from 30% to 40% pigment, from 1% to 3% additives, and from 30% to 40% solvents, typically xylene. Still another type of marine paint may contain from 15% to 20% polymer solids, optionally up to 5% rosin, from 35% to 50% copper(II) oxide, up to 5% total biocide, from 10% to 15% pigment, from 1% to 3% additives, and from 20% to 30% solvent. Generally, the ingredients are thoroughly mixed as follows: 200 ml of the paint composition is introduced into a tight metallic container of 0.5 L capacity together with 100 ml (bulk volume) of glass beads with a diameter of 2-3 mm The container is then shaken for 45 minutes on a mechanical shaker. The final paint composition is separated from the glass beads by filtration. The free and the microencapsulated DCOIT biocides are incorporated in the paint in an amount to provide the marine antifouling properties that are desired (e.g., a total of about 1.5% to 30% by weight. The amount required will be a function of the rate at which the free DCOIT is leached from the dried coating film and the rate at which the encapsulated DCOIT is leached from the microcapsules. In one embodiment, the capsules are added in an amount to provide about 2% DCOIT in the dry film. In one embodiment, the free DCOIT is added in an amount of from 0.25% to 15% of the weight of the film forming polymer or binder solids. Preferably, free DCOIT is added in an amount of from 5% to 15%. In still another embodiment, the free DCOIT is added in an amount of from 8% to 12%, preferably about 10%.

The free DCOIT may be added to the compositions of the invention in any convenient form. This includes adding it as a solution wherein the DCOIT is dissolved in a solvent compatible with the compositions. Preferably, the DCOIT is added as a solid material. Such a solid material may be, for example, in the form of a powder, flakes, or a melt. One convenient form is to add the material as a technical grade active ingredient such as, for example, KATHON 287T microbicide from Rohm and Haas Company. Encapsulation of DCOIT is described in detail, e.g., in U.S. Pat. No. 7,377,968.

EXAMPLES

GERSTEL TWISTER polydimethylsiloxane (PDMS) coated stir bars were purchased from Gerstel Gmbh. The paints used were Interlux MICRON 66 paint ("M66"), INTERSLEEK 970 paint ("P970") and INTERSLEEK 731 ("P731"), obtained commercially and mixed according to manufacturer's directions, except for the addition of DCOIT as described below.

Paint was mixed with DCOIT and adsorbent using orbital shaker (Red Devil Inc, USA) and applied on a Leneta paper or aluminum foil using a stainless steel gauge (wet film thickness 500 micrometer). Paint was dried overnight.

Paper on an appropriate support (20-40 sq·cm of paint surface) was immersed into 120 ml glass bottle containing 100 ml of artificial seawater, Twister stirring bar was inserted, and the bottle was placed on a stirring mixer. The stiffing rate was 600 rpm. At day 1, 4, 7, 14, and 21, TWISTER bars were removed from bottles, wiped with paper towel and placed into HPLC vials containing 1 ml of acetonitrile. Adsorbed biocide was extracted at 35C for 30 min. After extraction bars were wiped again and returned back to a bottles with seawater/MAF paint. The concentration of biocides was measured by HPLC. Agilent 1200 HPLC equipped with autosampler, column heater and diode-array detector was controlled by Chemstation software. DCOIT was analyzed using Ultra C18 column 150×4.6 cm (Restek Inc). The same isocratic conditions (70% acetonitrile, 2.3 ml/min) were used. DCOIT was detected at 280 nm. External standard technique was used for quantization of released biocides. Twister stiffing bar capacity was estimated as 400 micrograms based on previous calibrations. Cumulative release of DCOIT is reported in weight percent, based on the weight of DCOIT in the coating composition.

| % DCOIT/form/layer | lower layer | upper layer | total % DCOIT released by indicated day, as % of initial DCOIT | | | | | |
|---|---|---|---|---|---|---|---|---|
| | | | 1 | 5 | 7 | 14 | 21 | 28 |
| 1.4/CR1/lower | epoxy | SPC paint | 0.30 | 0.46 | 0.71 | 0.94 | 1.22 | 1.33 |
| 1.4/CR2/lower | epoxy | SPC paint | 0.49 | 0.89 | 1.36 | 1.73 | 2.20 | 2.62 |
| 1.4/CR3/lower | epoxy | SPC paint | 0.34 | 0.69 | 1.04 | 1.28 | 1.58 | 1.87 |
| 1.4/C9/lower | epoxy | SPC paint | 0.56 | 1.12 | 1.64 | 1.96 | 2.52 | 3.00 |
| 1.4/CR1'/lower | epoxy | SPC paint | 0.25 | 0.42 | 0.67 | 0.87 | 1.08 | 1.26 |
| 1.4/CR2'/lower | epoxy | SPC paint | 0.25 | 0.51 | 0.73 | 0.87 | 1.03 | 1.18 |
| 1.4/CR3'/lower | epoxy | SPC paint | 0.40 | 0.92 | 1.38 | 1.64 | 2.03 | 2.30 |
| 2.81/C9 | epoxy | none | 0.84 | 1.75 | 2.79 | 3.64 | 4.57 | 5.39[2] |
| 2.81/C9 | epoxy[1] | none | 0.50 | 1.04 | 1.57 | 2.11 | 2.75 | 3.36[3] |
| 1/CR1/upper | epoxy | SPC paint | 1.35 | 3.22 | 4.83 | 6.14 | 7.67 | 8.94 |
| 1/CR2/upper | epoxy | SPC paint | 2.33 | 5.08 | 7.45 | 9.62 | 10.9 | 12.9 |
| 1/CR3/upper | epoxy | SPC paint | 1.90 | 5.60 | 7.94 | 10.2 | 13.6 | 16.8 |
| 1/C9/upper | epoxy | SPC paint | 5.75 | 10.2 | 14.9 | 18.2 | 22.6 | 26.3 |
| 1.4/C9/upper | silicone2 | silicone1 | 5.26 | 9.19 | 11.6 | 13.6 | 17.3 | 20.6 |
| 1.4/CR1'/upper | silicone2 | silicone1 | 2.68 | 5.33 | 8.88 | 10.9 | 13.5 | 15.2 |
| 1.4/CR1/upper | silicone2 | silicone1 | 0.98 | 1.84 | 2.90 | 3.54 | 4.36 | 5.24 |
| 2.2/C9/lower | silicone2 | silicone1 | 4.28 | 7.62 | 10.8 | 12.7 | 14.8 | 16.7 |

-continued

| | | | total % DCOIT released by indicated day, as % of initial DCOIT | | | | | |
|---|---|---|---|---|---|---|---|---|
| % DCOIT/form/layer | lower layer | upper layer | 1 | 5 | 7 | 14 | 21 | 28 |
| 2.2/CR1'/lower | silicone2 | silicone1 | 1.19 | 3.49 | 5.82 | 7.55 | 8.91 | 11.3 |
| 2.2/CR1/lower | silicone2 | silicone1 | 1.03 | 1.94 | 3.19 | 4.00 | 4.82 | 5.68 |

Notes:
% DCOIT in the first column is the wt % DCOIT in the indicated layer
CR1 is 1:3 DCOIT:DOWEX OPTIPORE V503 resin (Dow Chem. Co.), ground to D50 <20 μm
CR2 is 1:3 DCOIT:CHROMABOND HR-P resin (Macherey-Nagel), PS/DVB, D50 = 91 microns
CR3 is 1:3 DCOIT:DARCO KB-G, D50 = 40 microns
CR designations with a prime symbol (') indicate separate addition of DCOIT and resin/carbon
C9 is SEANINE 211N biocide (Dow Chem. Co.), 30% DCOIT in xylenes
SPC paint is MICRON 66 paint (International Paints), wet thickness 254 microns
"epoxy" is INTERPROTECT 2000E epoxy coating (bisphenol A/polyamide hardener; International Paints) at 3:1 resin:hardener, wet thickness 254 microns
"silicone1" is INTERSLEEK 970 FRC paint (International Paints), wet thickness 127 microns
"silicone2" is INTERSLEEK 731 FRC paint (International Paints), wet thickness 127 microns
[1]Mixed at 6:1 resin:hardener
[2]6.26% at 35 days
[3]3.96% at 35 days The data demonstrate that much better controlled release is obtained when DCOIT is in an epoxy layer, as in the examples above the double line in the table, even when the DCOIT is not present in a controlled-release form (i.e., adsorbed on carbon or resin; see fourth, eighth and ninth rows of data). The data also demonstrate that release is better controlled initially by using a higher weight ratio of aromatic epoxy resin to hardener.

The invention claimed is:

1. A coated substrate comprising an epoxy coating, said epoxy coating comprising from 0.5 wt % to 3.5 wt % 4,5-dichloro-2-n-octylisothiazolin-3-one, having a thickness from 40 microns to 320 microns and comprising a cured aromatic epoxy resin which comprises polymerized units of bisphenol A;
   wherein the substrate has a second coating layer, wherein said epoxy coating is between the substrate and the second coating layer.

2. The coated substrate of claim 1 in which the second coating layer is a self-polishing coating.

3. The coated substrate of claim 2 in which the second coating layer is a metal acrylate copolymer coating.

4. The coated substrate of claim 3 in which 4,5-dichloro-2-n-octylisothiazolin-3-one is adsorbed on a carbon-based adsorbent or a polymeric resin, or encapsulated.

5. The coated substrate of claim 4 in which the second coating layer has less than 0.5 wt % 4,5-dichloro-2-n-octylisothiazolin-3-one.

6. The coated substrate of claim 1 in which the cured aromatic epoxy resin comprises at least 80 wt % bisphenol A.

7. The coated substrate of claim 6 in which the second coating layer is a self-polishing metal acrylate copolymer coating.

8. The coated substrate of claim 7 in which 4,5-dichloro-2-n-octylisothiazolin-3-one is adsorbed on a carbon-based adsorbent or a polymeric resin, or encapsulated.

9. The coated substrate of claim 8 in which the cured aromatic epoxy resin comprises at least 95 wt % bisphenol A.

10. The coated substrate of claim 9 in which 4,5-dichloro-2-n-octylisothiazolin-3-one is adsorbed on an activated carbon having a surface area of at least 1200 $m^2$/g.

11. The coated substrate of claim 10 in which the second coating layer has less than 0.5 wt % 4,5-dichloro-2-n-octylisothiazolin-3-one.

12. The coated substrate of claim 4 in which 4,5-dichloro-2-n-octylisothiazolin-3-one is adsorbed on an activated carbon having a surface area of at least 1200 $m^2$/g.

13. The coated substrate of claim 12 in which the epoxy coating epoxy coating comprises from 1 wt % to 2 wt % 4,5-dichloro-2-n-octylisothiazolin-3-one.

14. The coated substrate of claim 11 in which the epoxy coating epoxy coating comprises from 1 wt % to 2 wt % 4,5-dichloro-2-n-octylisothiazolin-3-one.

\* \* \* \* \*